United States Patent
Yorimoto

(10) Patent No.: US 7,876,658 B2
(45) Date of Patent: Jan. 25, 2011

(54) OPTICAL-DISK DEVICE AND RECORD-CONTROL METHOD WITH DISC-MANAGEMENT INFORMATION WRITING FEATURES

(75) Inventor: Kenji Yorimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 525 days.

(21) Appl. No.: 11/947,046

(22) Filed: Nov. 29, 2007

(65) Prior Publication Data

US 2008/0137496 A1  Jun. 12, 2008

(30) Foreign Application Priority Data

Dec. 12, 2006  (JP) ............................ 2006-334849

(51) Int. Cl.
*G11B 7/00* (2006.01)
(52) U.S. Cl. ................................ 369/53.24; 369/275.3
(58) Field of Classification Search ............. 369/53.24, 369/53.2, 53.41, 53.42, 53.15, 53.17, 275.3
See application file for complete search history.

(56) References Cited

U.S. PATENT DOCUMENTS

| | | | | |
|---|---|---|---|---|
| 7,317,670 B2 * | 1/2008 | Park | ......................... | 369/53.15 |
| 7,570,557 B2 * | 8/2009 | Kim | ......................... | 369/53.15 |
| 2006/0007801 A1 | 1/2006 | Takashima | | |
| 2008/0273448 A1 * | 11/2008 | Nakamura | ................ | 369/275.3 |
| 2008/0279063 A1 * | 11/2008 | Nakamura | ................ | 369/47.15 |
| 2008/0304377 A1 * | 12/2008 | Nakamura | ................ | 369/47.14 |
| 2008/0304378 A1 * | 12/2008 | Yamamoto et al. | ........ | 369/47.14 |
| 2008/0304382 A1 * | 12/2008 | Nakamura | ................ | 369/53.17 |

FOREIGN PATENT DOCUMENTS

JP          2006-24287       1/2006

* cited by examiner

*Primary Examiner*—Tan X Dinh
(74) *Attorney, Agent, or Firm*—Oblon, Spivak, McClelland, Maier & Neustadt, L.L.P.

(57) ABSTRACT

An optical-disk device includes a record unit recording data onto an optical disk, and a management-information-record unit configured to additionally write the latest disk-management information about the optical disk in management-information-record areas provided on the optical disk. When a first area of the management-information-record areas is short of a vacant area used to additionally write the disk-management information, the management-information-record unit records padding data in an unrecorded area of the first area, and additionally writes the disk-management information in a second area of the management-information-record areas, and wherein when the first area includes an unrecordable area where the disk-management information can be additionally written with difficulty, the management-information-record unit stops additionally writing the disk-management information in the first area, and additionally writes the disk-management information in the second area.

5 Claims, 2 Drawing Sheets

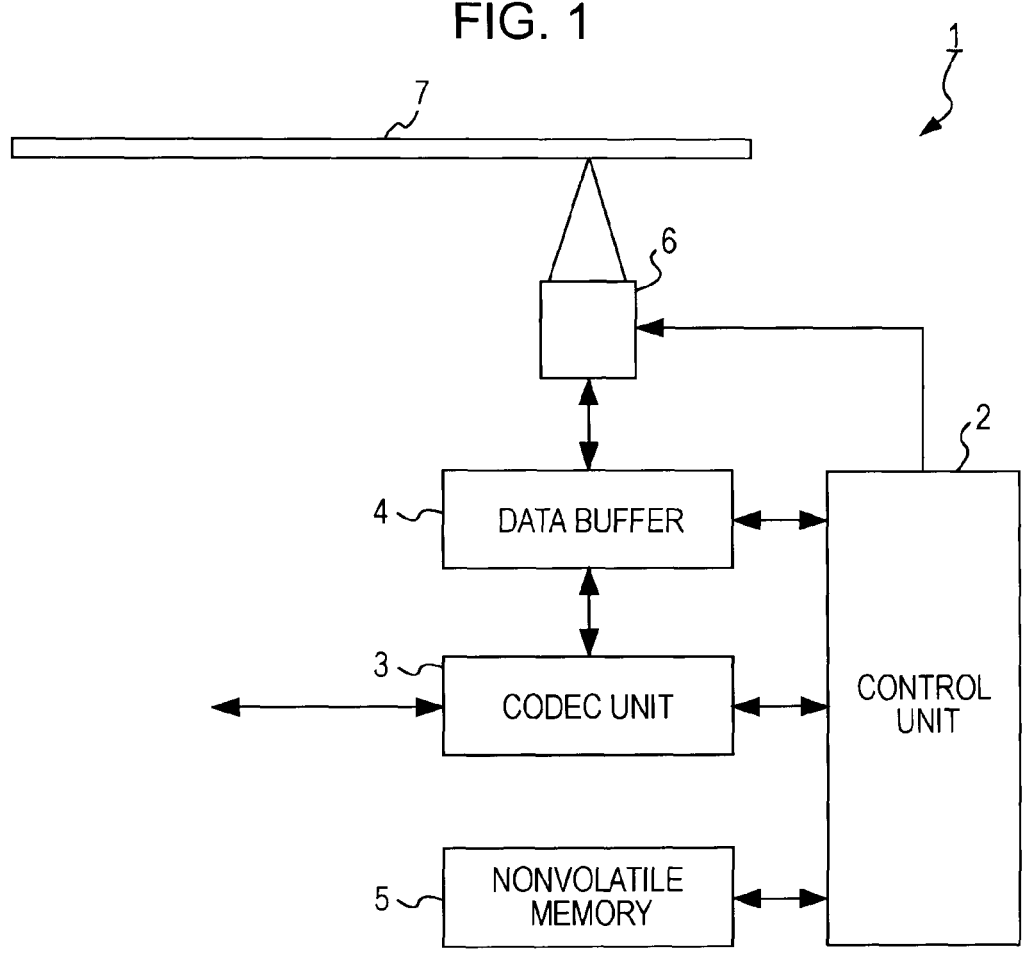
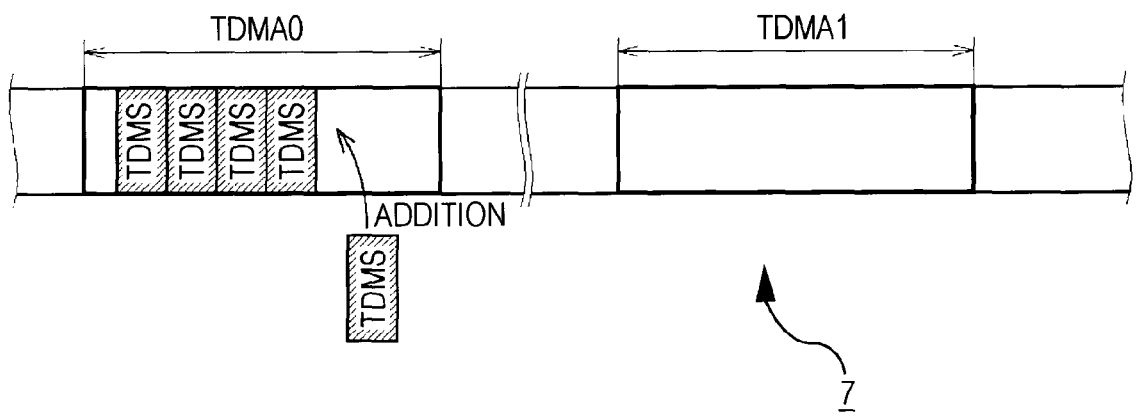

OPTICAL-DISK DEVICE AND RECORD-CONTROL METHOD WITH DISC-MANAGEMENT INFORMATION WRITING FEATURES

CROSS REFERENCES TO RELATED APPLICATIONS

The present invention contains subject matter related to Japanese Patent Application JP 2006-334849 filed in the Japanese Patent Office on Dec. 12, 2006, the entire contents of which are incorporated herein by reference.

BACKGROUND OF THE INVENTION

1. Field of the Invention

The present invention relates to an optical-disk device and a record-control method, and can be used to record data onto an optical disk.

2. Description of the Related Art

Hitherto, rewritable (RW) optical disks and/or write-once (R) optical disks allowing users to record data without restraint, and optical-disk devices and/or apparatuses ready for the above-described optical disks have been widely available.

Further, "Blu-ray Disc (Registered Trademark)" using a blue laser light with the wavelength of 405 nm had been developed, so as to achieve an increased record capacity. Here, the wavelength of "Blu-ray Disc (Registered Trademark)" is shorter than those of a compact disk (CD) and/or a digital versatile disk (DVD) of related arts. "Blu-ray Disc (Registered Trademark)" also includes a BD-RE, which is of the rewritable type, and a BD-R, which is of the write-once type. The above-described technologies are disclosed in Japanese Patent Application No. 2006-24287, for example.

SUMMARY OF THE INVENTION

Here, each time data is recorded onto the BD-R and/or the BD-R is inserted into an optical-disk device, disk-management information indicating the data-record structure, a defect of the disk, etc. (hereinafter referred to as temporary disc management structure (TDMS)) is updated, and the updated TDMS is additionally written in a temporary disc management area (TDMA) used as a management-information-write area provided onto the disk at a predetermined position.

A plurality of the TDMAs is provided in a read-in area and/or a data area existing at the inner radius of the disk. The TDMAs are numbered in consecutive order, such as a TDMAn (n=0, 1, 2, ... ). Then, the TDMAs are used in the consecutive order, such as a TDMA0, a TDMA1, a TDMA2, and so forth. Further, the TDMSs are consecutively recorded in each of the TDMAs from the head of each of the TDMAs.

Further, an area where a TDMA-access indicator (hereinafter referred to as a TAI) indicating what TDMA is effective (namely, in what TDMA should a TDMS be recorded) is written is provided on the BD-R at the head of the TDMA0.

When recording data onto the BD-R, first, the optical-disk device records the TDMSs in the TDMA0 from the head of the TDMA0. Then, when the TDMA0 includes a vacant area which is not large enough to additionally write another TDMS, padding (padding the vacant area with meaningless data such as "0", for example) is performed for the vacant area of the TDMA0. Then, the optical-disk device writes a TAI1 in a predetermined area, where the TAI1 indicates the TDMA1 where the next TDMS should be recorded, and records TDMSs in the TDMA1 from the head of the TDMA1. As described above, when a vacant area of the TDMAn where the TDMSs are being recorded is not large enough to additionally write another TDMS, the padding is performed for the vacant area of the TDMAn, and a TAI[n+1] indicating the TDMA [n+1] where the next TDMS should be recorded is written in a predetermined area, and the TDMS is recorded in the TDMA[n+1].

Thus, in the case where the BD-R is used, when the vacant area of the TDMA where the TDMSs are being recorded is not large enough to additionally write another TDMS, the TDMS is recorded in the next TDMA after performing the padding for the remaining area.

However, if the TDMA includes an unrecordable area occurring due to a defect, soil, etc., it becomes difficult to skip the unrecordable area and record the TDMS in the unrecordable area, since the above-described configuration expressed as "the TDMSs are consecutively recorded in each of the TDMAs from the head of each of the TDMAs" is the rule. Further, the above-described configuration expressed as "when the vacant area of the TDMA is not large enough to additionally write another TDMS, the padding is performed for the remaining area" is the rule. Therefore, it is difficult to start recording the TDMS in the next TDMA when the unrecordable area and beyond are left blank.

Therefore, if the unrecordable area occurs in the TDMA of the BD-R, it becomes difficult to additionally write the latest TDMS on the BD-R. Subsequently, not only it becomes difficult to record data onto the BD-R, but also the BD-R may become unreproducible.

Accordingly, the present invention proposes an optical-disk device and a record-control method that can keep an optical disk recordable and reproducible at all times.

Therefore, an optical-disk device according to an embodiment of the present invention includes a record unit configured to record data onto an optical disk, and a management-information-record unit configured to additionally write latest disk-management information about the optical disk in a plurality of management-information-record areas provided on the optical disk. When a first management-information-record area of the management-information-record areas is short of a vacant area used to additionally write the disk-management information, the management-information-record unit records padding data in an unrecorded area of the first management-information-record area, and additionally writes the disk-management information in a second management-information-record area of the management-information-record areas. Further, when the first management-information-record area includes an unrecordable area where the disk-management information can be additionally written with difficulty, the management-information-record unit stops additionally writing the disk-management information in the first management-information-record area, and additionally writes the disk-management information in the second management-information-record area.

Subsequently, even though the management-information-record area of the optical disk includes the unrecordable area, it becomes possible to additionally write the disk-management information with stability without being hampered by the unrecordable area and keep the optical disk recordable and reproducible.

Further, a record-control method according to another embodiment of the present invention is used for an optical-disk device configured to additionally write latest disk-management information about an optical disk recording data in a plurality of management-information-record areas provided on the optical disk. The record-control method includes the steps of recording padding data in an unrecorded area of a first management-information-record area of the management-information-record areas, and additionally writing the disk-management information in a second management-information-record area of the management-information-record areas when the first management-information-record area is short of a vacant area used to additionally write the disk-management information, and stopping additionally writing the disk-management information in the first management-information-record area, and additionally writing the disk-management information in the second management-information-record area when the first management-information-record area includes an unrecordable area where the disk-management information can be additionally written with difficulty.

Subsequently, even though the management-information-record area of the optical disk includes the unrecordable area, it becomes possible to additionally write the disk-management information with stability without being hampered by the unrecordable area and keep the optical disk recordable and reproducible.

According to the above-described embodiments of the present invention, when the first management-information-record area is short of the vacant area used to additionally write the disk-management information, the padding data is recorded in the unrecorded area of the first management-information-record area, and the disk-management information is additionally written in the second management-information-record area. Further, when the first management-information-record area includes the unrecordable area where the disk-management information can be additionally written with difficulty, additionally writing the disk-management information in the first management-information-record area is stopped, and the disk-management information is additionally written in the second management-information-record area. Subsequently, even though the management-information-record area of the optical disk includes the unrecordable area, it becomes possible to additionally write the disk-management information with stability without being hampered by the unrecordable area. Therefore, it becomes possible to achieve the optical-disk device and the record-control method that can keep the optical disk recordable and reproducible at all times.

BRIEF DESCRIPTION OF THE DRAWINGS

FIG. 1 is a block diagram illustrating the entire configuration of an optical-disk device;

FIG. 2 is a schematic diagram illustrating an example of the addition of a TDMS to a TDMA;

DESCRIPTION OF THE PREFERRED EMBODIMENTS

Figure 3:
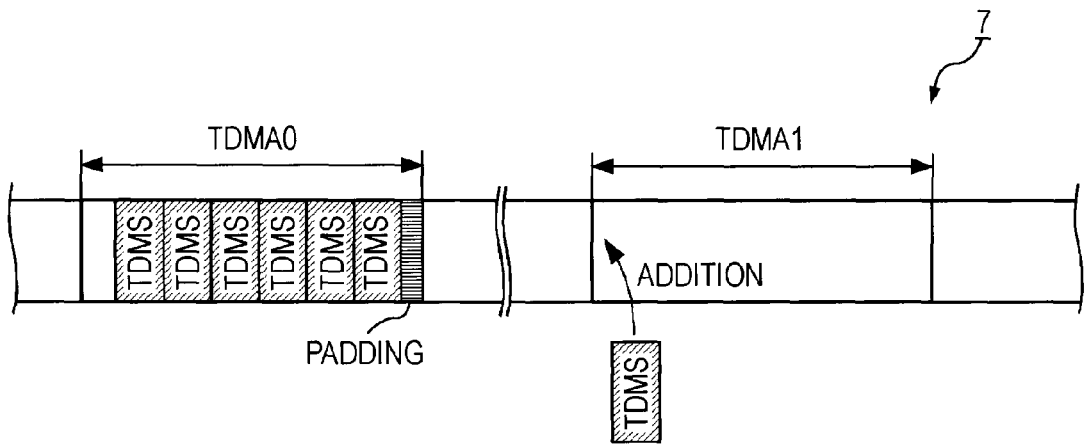
FIG. 3 is a schematic diagram illustrating another example of the addition of the TDMS to the TDMA.

An embodiment of the present invention will be described in detail with reference to the attached drawings.

(1) General Configuration of Optical-disk Device

FIG. 1 shows an optical-disk device 1 according to an embodiment of the present invention, where the optical-disk device is provided for "Blu-ray Disc (Registered Trademark)". The optical-disk device 1 includes a control unit 2 configured to control the entire device, and a codec unit 3, a data buffer 4, and a nonvolatile memory 5 that are connected to the control unit 2.

When video data is recorded onto an optical disk 7 provided, as "Blu-ray Disc (Registered Trademark)", the optical-disk device 1 generates stream data by encoding an externally transmitted video signal in real time through the codec unit 3, and transmits the stream data to an optical pick-up 6 while temporarily accumulating the stream data in the data buffer 3.

The optical pick-up 6 provided, as a record section, drives a laser diode (not shown) based on the transmitted stream data and irradiates the optical disk 7 with a light beam so that the stream data is recorded. At that time, the control unit 2 performs control so that address data recorded onto the record surface of the optical disk 7 is irradiated with a laser light emitted from the optical pick-up 6 by controlling a thread-drive mechanism (not shown).

At that time, the control unit 2 provided, as a management-information-record section, recognizes a temporary-disc-management area (TDMA) functioning, as a management-information-write area which is currently effective, by referring to a TDMA-access indicator (TAI) provided in a TDMA0 of the optical disk 7 which is inserted. Further, the control unit 2 searches for the rear end of data recorded in the currently effective TDMA and writes data on a temporary-disc-management structure (TDMS), as disk-management information, so that the TDMS follows the rear end.

In actuality, when recording data onto the optical disk 7 including a Blu-ray Disc Recordable (BD-R), the control unit 2 records the TDMS in the TDMA0 from the head of the TDMA0, as, shown in FIG. 2. Then, when a vacant area of the TDMA0 is not large enough to additionally write another TDMS, the control unit 2 performs padding for the vacant area of the TDMA0, as shown in FIG. 3, and writes a TAI1 in a predetermined area of the TDMA0, where the TAI1 indicates a TDMA1 where the next TDMS should be recorded, and records TDMSs in the TDMA1 from the head of the TDMA1.

As described above, when a vacant area of the TDMA0 is not large enough to additionally write another TDMS in a TDMAn provided, as a management-information-record area where the TDMSs are currently recorded, padding is performed for the vacant area of the TDMAn. After that, a TAI [n+1] is written in a predetermined area, where the TAI[n+1] indicates a TDMA[n+1] functioning, as another management-information-record area where the next TDMS should be recorded. Then, the TDMS is recorded in the TDMA[n+1].

Subsequently, the latest TDMS is written onto the optical disk 7, as the aftermost of data recorded in the currently effective TDMA indicated with the TAI. Then, the optical-disk device 1 can recognize the latest record structure, a defect, etc. of the optical disk 7 by referring to the aftermost TDMS recorded in the currently effective TDMA indicated with the TAI.

(2) Processing Performed When a TDMA is Recorded with Difficulty According to an Embodiment of the Present Invention Thus, at the data-recording time, the optical-disk device 1 records TDMSs in the currently effective TDMA from the head thereof. Then, when a vacant area is not large enough to additionally write another TDMS, the optical-disk device 1 performs padding for the remaining vacant area, and records the TDMSs in the next TDMA.

However, if the TDMA includes an unrecordable area caused by a defect, soil, etc., not only it becomes difficult to record the TDMS in the unrecordable area, but also it becomes difficult to record padding data in the unrecordable area. Subsequently, when trying to record the TDMS according to the above-described record procedures (padding is performed for a vacant area of the TDMAn, where the vacant area is not large enough to additionally write another TDMS, and the TDMS is recorded in the next TDMS[n+1]), it becomes difficult to record another TDMS, since it is difficult to record the padding data.

Accordingly, if the unrecordable area is detected from the TDMA while the TDMS is recorded, the optical-disk device 1 stops recording the TDMS in the TDMA, and records the TDMS in the next TDMS without performing padding for a remaining area of the TDMA.

That is to say, if the unrecordable area is detected from the currently effective TDMAn functioning, as a management-information-record area, while the TDMS is recorded in the TDMAn, the control unit 2 stops recording the TDMS in the TDMAn.

Figure 4:
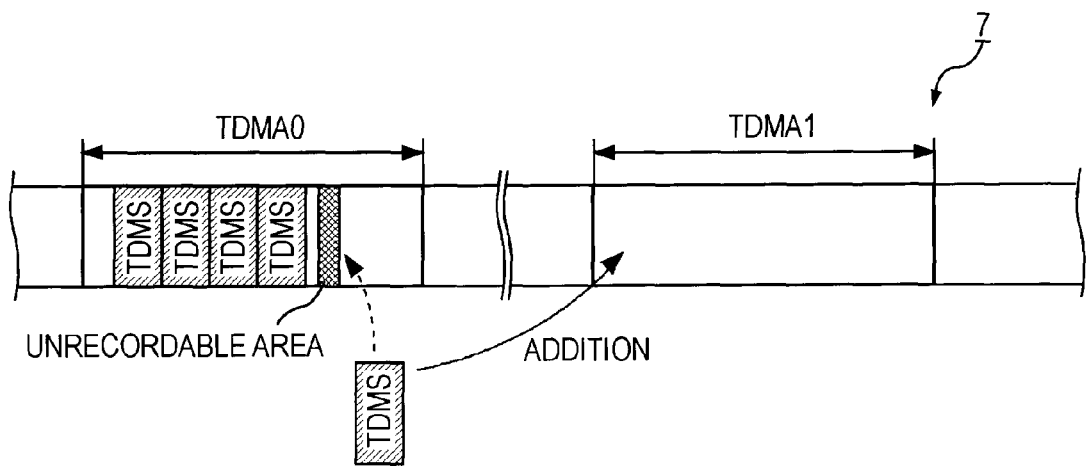
FIG. 4 is a schematic diagram illustrating the TDMS addition performed when an unrecordable area exists.

Then, the control unit 2 writes the TAI[n+1] in a predetermined area of the TDMA0, where the TAI[n+1] indicates the TDMA[n+1] where the next TDMS should be recorded, without performing padding for a vacant area remaining in the TDMAn. After that, as shown in FIG. 4, the control unit 2 records the TDMS that should have been recorded in the TDMAn where the unrecordable area occurs in the TDMA [n+1] again, where the TDMA[n+1] functions, as another effective management-information-record area.

In that case, the used TDMA of the optical disk 7, where the unrecordable area occurs in the used TDMA, includes a remaining vacant area where no padding data is recorded. However, the vacant area presents no obstacle to data reproduction when the optical disk 7 is identified.

That is to say, when identifying the optical disk 7 including the BD-R, the optical-disk device 1 recognizes an effective TDMA by referring to the TAI written in the TDMA0 in the above-described manner, and recognizes the latest record structure, a defect, etc. of the optical disk 7 by referring to a TDMS recorded at the rear end of the effective TDMA. Subsequently, even though a used TDMA includes a vacant area, the optical-disk device 1 can refer to the latest TDMS according to the TAI without being hampered by the vacant area.

(3) Operations and Advantages

According to the above-described configurations, when detecting an unrecordable area from the currently effective TDMAn where the TDMS is recorded while data is recorded onto the optical disk 7 including a BD-R, the optical-disk device 1 stops recording the TDMS in the TDMAn. Further, the optical-disk device 1 writes the TAI[n+1] indicating the next TDMA[n+1] in a predetermined area of the TDMA0 without performing padding for the vacant area remaining in the TDMAn, so as to make the TDMA[n+1] effective. Then, the optical-disk device 1 writes the TDMS that should have been recorded in the TDMAn where the unrecordable area occurs in the above-described effective TDMA[n+1] again.

Accordingly, even though a TDMA includes an unrecordable area, the optical-disk device 1 can record a TDMS in the next TDMA without being hampered by the unrecordable area.

According to the above-described configuration, it becomes possible to additionally write a TDMS with stability and keep a BD-R writable and reproducible even though a TDMA of the BD-R includes an unrecordable area.

(4) Other Embodiments

According to the above-described embodiment, when an unrecordable area is detected from the currently effective TDMAn while a TDMS is recorded in the TDMAn, the TDMS recording for the TDMAn is stopped, and the next TDMA[n+1] is made effective and the TDMS recording is performed without performing padding for a vacant area remaining in the TDMAn. However, without being limited to the above-described embodiment, when the unrecordable area is detected from the TDMAn while the TDMS is recorded in the TDMAn, padding is performed for a vacant area other than the unrecordable area, the next TDMA[n+1] is made effective, and the TDMS recording is performed.

In that case, it becomes also possible to additionally write the TDMS with stability and keep the BD-R recordable and reproducible without being hampered by the unrecordable area of the TDMA.

Further, according to the above-described embodiments, the TDMS provided, as disk-management information of the BD-R, is recorded in the TDMA provided, as the management-information-record area. However, without being limited to the above-described embodiments, the present invention can be used for various types of optical disks including a management-information-record area where disk-management information is recorded.

It should be understood by those skilled in the art that various modifications, combinations, sub-combinations and alterations may occur depending on design requirements and other factors insofar as they are within the scope of the appended claims or the equivalents thereof.

What is claimed is:

1. An optical-disk device comprising:
   record means configured to record data onto an optical disk; and
   management-information-record means configured to additionally write latest disk-management information about the optical disk in a plurality of management-information-record areas provided on the optical disk,
   wherein when a first management-information-record area of the management-information-record areas is short of a vacant area used to additionally write the disk-management information, the management-information-record means records padding data in an unrecorded area of the first management-information-record area, and additionally writes the disk-management information in a second management-information-record area of the management-information-record areas, and
   wherein when the first management-information-record area includes an unrecordable area where the disk-management information is at least partially additionally written with difficulty, the management-information-record means stops additionally writing the disk-management information in the first management-information-record area, and additionally writes the disk-management information in the second management-information-record area.

2. The optical-disk device according to claim 1, wherein when the first management-information-record area includes the unrecordable area where the disk-management information can be additionally written with difficulty, the management-information-record means records the padding data in an unrecorded area excluding the unrecordable area, the unrecorded area occurring on the first management-information-record area, and additionally writes the disk-management information in the second management-information-record area.

3. The optical-disk device according to claim 1, wherein the disk-management information includes record-structure information and defect-management information that relate to the data recorded onto the optical disk.

4. A record-control method used for an optical-disk device configured to additionally write latest disk-management information about an optical disk recording data in a plurality of management-information-record areas provided on the optical disk, the record-control method comprising the steps of:

recording padding data in an unrecorded area of a first management-information-record area of the management-information-record areas, and additionally writing the disk-management information in a second management-information-record area of the management-information-record areas when the first management-information-record area is short of a vacant area used to additionally write the disk-management information; and stopping additionally writing the disk-management information in the first management-information-record area, and additionally writing the disk-management information in the second management-information-record area when the first management-information-record area includes an unrecordable area where the disk-management information is at least partially additionally written with difficulty.

5. An optical-disk device comprising:

a record unit configured to record data onto an optical disk; and a management-information-record unit configured to additionally write latest disk-management information about the optical disk in a plurality of management-information-record areas provided on the optical disk, wherein when a first management-information-record area of the management-information-record areas is short of a vacant area used to additionally write the disk-management information, the management-information-record unit records padding data in an unrecorded area of the first management-information-record area, and additionally writes the disk-management information in a second management-information-record area of the management-information-record areas, and wherein when the first management-information-record area includes an unrecordable area where the disk-management information is at least partially additionally written with difficulty, the management-information-record unit stops additionally writing the disk-management information in the first management-information-record area, and additionally writes the disk-management information in the second management-information-record area.

* * * * *